(12) United States Patent
Wardhana et al.

(10) Patent No.: US 8,089,604 B2
(45) Date of Patent: Jan. 3, 2012

(54) LIQUID CRYSTAL DISPLAY PANEL AND METHODS OF MANUFACTURING THE SAME

(75) Inventors: Jane K. Wardhana, St. Paul, MN (US); Amy J. Hite, Cottage Grove, MN (US); Donald G. Peterson, Shoreview, MN (US); James N. Dobbs, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 627 days.

(21) Appl. No.: 11/768,283

(22) Filed: Jun. 26, 2007

(65) Prior Publication Data

US 2009/0002622 A1 Jan. 1, 2009

(51) Int. Cl.
*G02F 1/1333* (2006.01)
*G02F 1/13* (2006.01)

(52) U.S. Cl. .................................. 349/158; 349/187

(58) Field of Classification Search .............. 349/152, 349/158–160, 187, 189
See application file for complete search history.

(56) References Cited

U.S. PATENT DOCUMENTS

| | | | |
|---|---|---|---|
| 4,293,435 A | 10/1981 | Portugall | |
| 5,332,522 A | 7/1994 | Chen | |
| 5,516,455 A | 5/1996 | Jacobine | |
| 5,744,057 A | 4/1998 | Meyer | |
| 5,780,629 A | 7/1998 | Etzbach | |
| 5,847,068 A | 12/1998 | Maxein | |
| 5,886,242 A | 3/1999 | Etzbach | |
| 6,741,315 B1 * | 5/2004 | Uchiyama | 349/149 |
| 6,873,394 B2 | 3/2005 | Noiri et al. | |
| 7,081,180 B2 | 7/2006 | Chen | |
| 2002/0018173 A1 | 2/2002 | Furukawa | |
| 2004/0008179 A1 | 1/2004 | Chung et al. | |
| 2004/0017520 A1 | 1/2004 | Yoo | |
| 2004/0045830 A1 | 3/2004 | Tseng | |
| 2005/0001954 A1 * | 1/2005 | Stephenson et al. | 349/86 |
| 2005/0118921 A1 | 6/2005 | Jung | |
| 2006/0114387 A1 * | 6/2006 | Song et al. | 349/124 |
| 2006/0137813 A1 | 6/2006 | Robrecht | |
| 2006/0246379 A1 | 11/2006 | Robrecht | |

FOREIGN PATENT DOCUMENTS

| | | |
|---|---|---|
| JP | 58-181022 | 10/1983 |
| JP | 2002-049027 | 2/2002 |
| KR | 10-2005-0082449 | 8/2005 |
| WO | WO 2006/011695 | 2/2006 |

OTHER PUBLICATIONS

U.S. Appl. No. 11/557,540, filed Nov. 8, 2006, Roberts.
Deng-ke Yang et al., Annu. Rev. Mater. Sci. 1977, 27, 1170146.

* cited by examiner

*Primary Examiner* — Mark Robinson
*Assistant Examiner* — Michael Inadomi

(57) ABSTRACT

A liquid crystal cell article includes a layer of liquid crystal material disposed between a first polymeric substrate and a second polymeric substrate. The first polymeric substrate includes a plurality of first parallel conductive traces extending in a first direction and disposed between the layer of liquid crystal material and the first substrate, and a first release liner disposed on the first polymeric substrate. The second polymeric substrate includes a plurality of second parallel conductive traces extending in a second direction orthogonal to the first direction and disposed between the layer of liquid crystal material and the second substrate. The first polymeric substrate further includes a removable portion that is separable from the first polymeric substrate with the first release liner to expose a portion of the layer of liquid crystal material or second parallel conductive traces.

19 Claims, 5 Drawing Sheets

LIQUID CRYSTAL DISPLAY PANEL AND METHODS OF MANUFACTURING THE SAME

FIELD

The present disclosure relates to liquid crystal display panels and particularly to passive matrix display panels and methods of manufacturing the same.

BACKGROUND

The flexible display device field has received much attention due to its feasible manufacturing via a roll-to-roll process. Roll-to-roll production has several potential benefits such as known precise coating techniques, potentially cheaper manufacturing costs, and faster production cycles.

Manufacturing passive matrix devices via a continuous web line poses a problem in singulating the devices with simultaneous access to the conductive electrical leads buried within the passive matrix device. Flexible devices that are conducive to a passive matrix driving scheme, such as cholesteric liquid crystal display devices, usually contain rows and columns of conductive traces such as indium-tin oxide on opposing substrates through which the electrical pulses or signals are sent to switch the devices. Conductive traces are patterned on top of substrates such as a polymeric substrate. Obtaining access to these electrical leads in a device produced via a roll-to-roll process is challenging because, given identical width webs, all the contacts are buried inside the construction.

This is partially alleviated by offsetting the substrates giving access to the electrical leads running perpendicular to the web direction. Alternatively, the top and bottom substrates can be cut to different sizes to singulate the devices without losing access to the electrical leads. Conventional cutting techniques are especially difficult for devices with thin display material coating between the substrates. Cutting through one substrate without scratching the electrical leads on the opposing substrate is not trivial since very few precise-depth cutting technologies can be accurate in the micrometer range.

BRIEF SUMMARY

The present disclosure relates to liquid crystal display panels and particularly to passive matrix display panels and methods of manufacturing the same.

In a first embodiment, a liquid crystal cell article includes a layer of liquid crystal material disposed between a first polymeric substrate and a second polymeric substrate. The first polymeric substrate includes a plurality of first parallel conductive traces extending in a first direction and disposed between the layer of liquid crystal material and the first substrate, and a first release liner disposed on the first polymeric substrate. The second polymeric substrate includes a plurality of second parallel conductive traces extending in a second direction orthogonal to the first direction and disposed between the layer of liquid crystal material and the second substrate. The first polymeric substrate further includes a removable portion that is separable from the first polymeric substrate with the first release liner to expose a portion of the layer of liquid crystal material or second parallel conductive traces.

In another embodiment, a method of manufacturing a liquid crystal cell includes providing a liquid crystal cell article having a layer of liquid crystal material disposed between a first polymeric substrate and a second polymeric substrate. The first polymeric substrate includes a plurality of first parallel conductive traces extending in a first direction and disposed between the layer of liquid crystal material and the first substrate, and a first release liner disposed on the first polymeric substrate, the first polymeric substrate further comprising a removable portion that can be formed before disposing the layer of liquid crystal material. The second polymeric substrate includes a plurality of second parallel conductive traces extending in a second direction orthogonal to the first direction and disposed between the layer of liquid crystal material and the second substrate. The method further includes separating the first release liner and the removable portion to expose a portion of the layer of liquid crystal material or a portion of the second parallel conductive traces.

In a further embodiment, a method of manufacturing a liquid crystal cell includes disposing a layer of liquid crystal material between a first polymeric substrate and a second polymeric substrate forming a liquid crystal cell. The first polymeric substrate includes a plurality of first parallel conductive traces extending in a first direction and disposed between the layer of liquid crystal material and the first substrate, and a first release liner disposed on the first polymeric substrate, the first polymeric substrate further comprising a removable portion. The second polymeric substrate includes a plurality of second parallel conductive traces extending in a second direction orthogonal to the first direction and disposed between the layer of liquid crystal material and the second substrate. The method further includes separating the first release liner and the removable portion to expose a portion of the layer of liquid crystal material or a portion of the second parallel conductive traces.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to liquid crystal display panels and particularly to passive matrix display panels and methods of manufacturing the same. Instead of doing a precision-depth cutting following the formation of the liquid crystal cell (and risking scratching or destroying the electrical leads on the opposing substrate), "windows" can be pre-cut in the substrate(s) before liquid crystal coating and laminating and removed later in the process after the liquid crystal coating and lamination steps. The "window" can be rectangular, a slit or any other pattern of a size and shape required to access the electrical leads. Pre-cutting these "windows" or slits on the substrates eliminates the need of cutting the substrate after coating and thus reduces the risk of damaging the conductive leads on the opposite substrate and losing conductivity in these leads. While the present invention is not so limited, an appreciation of various aspects of the invention will be gained through a discussion of the examples provided below.

Figure 1:
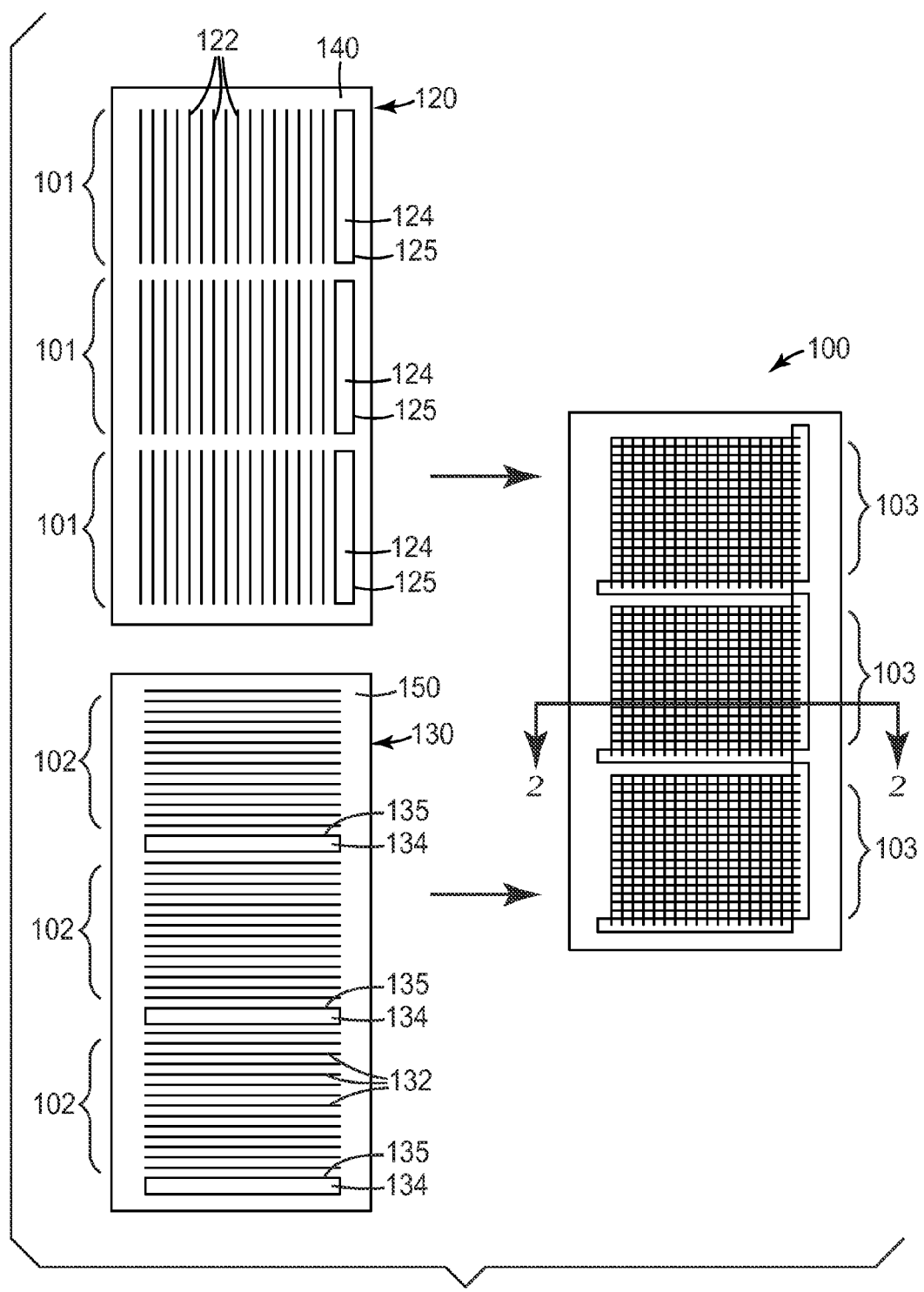
FIG. 1 is a schematic top view of an illustrative lamination of two substrates forming a number of liquid crystal cells on continuous webbing.
Figure 2:
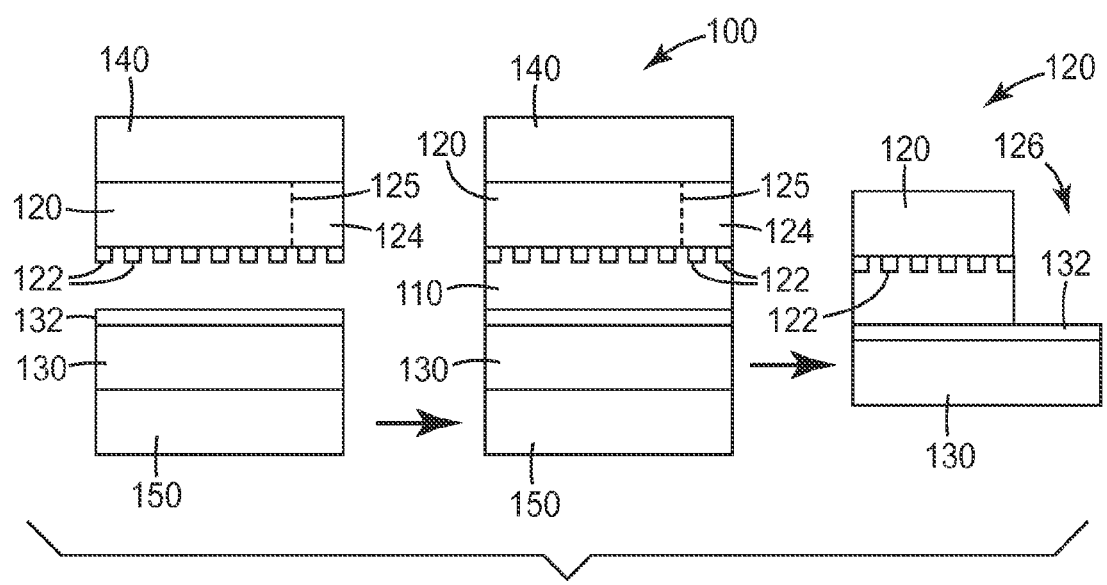
FIG. 2 is a schematic side view of the illustrative lamination shown in FIG. 1 and taken along line 2-2.

FIG. 1 is a schematic top view of an illustrative lamination of two substrates forming a number of liquid crystal cells 100 on continuous webbing. Each illustrated substrate is a segment of continuous webbing, where each segment has three cells. It is understood that each substrate can have more or less cells and in many embodiments, that the each continuous webbing has a plurality of cell such as, for example, 10 or more, 25 or more, 50 or more, or 100 or more, as desired. FIG. 2 is a schematic side view of the illustrative lamination shown in FIG. 1 and taken along line 2-2. Each liquid crystal cell segment 100 includes a layer of liquid crystal material 110 disposed between a first polymeric substrate 130 and a second polymeric substrate 120.

The first polymeric substrate 130 includes a plurality of first parallel conductive traces 132 extending in a first direction and disposed between the layer of liquid crystal material 110 and the first substrate 130. A first release liner 150 is disposed on the first polymeric substrate 130. In many embodiments, the plurality of first parallel conductive traces 132 are divided into a plurality of discrete first portions 102 having first trace ends and opposing second trace ends.

The second polymeric substrate 120 includes a plurality of second parallel conductive traces 122 extending in a second direction orthogonal to the first direction and disposed between the layer of liquid crystal material 110 and the second substrate 120. In many embodiments, a second release liner 140 is disposed on the second polymeric substrate 120. In many embodiments, the plurality of second parallel conductive traces 122 are divided into a plurality of discrete second portions 101 having first trace ends and opposing second trace ends. In some embodiments, the plurality of second parallel conductive traces 122 are continuous lines that have trace ends formed by singulating each cell.

The first polymeric substrate 130 further includes a removable portion 134 that is separable from the first polymeric substrate 130 with the first release liner 150 to expose a portion of the layer of liquid crystal material 110, that is wiped away to expose second parallel conductive traces 122. The removable portion 134 is separated with the liner 150 and away from the first polymeric substrate 130 as the removable liner 150 separates from the remaining first polymeric substrate 130. The removable portion 134 is defined by a predetermined slit or line of weakness 135 such as, for example, a perforation line. The predetermined slit or line of weakness 135 can be formed by any useful method such as, for example, die cutting, laser cutting, and the like.

In many embodiments as illustrated in FIG. 1, the second polymeric substrate 120 further includes a removable portion 124 that is separable from the second polymeric substrate 120 with the second release liner 140 to expose a portion 126 of the layer of liquid crystal material 110, that can be wiped away to expose first parallel conductive traces 132. The removable portion 124 is separated with the liner 140 and away from the second polymeric substrate 120 as the removable liner 140 separates from the remaining second polymeric substrate 120. The removable portion 124 is defined by a predetermined slit or line of weakness 125 such as, for example, a perforation line. The predetermined slit or line of weakness 125 can be formed by any useful method such as, for example, die cutting, laser cutting, embossing, and the like.

The first portions 102 and second portions 101 are registered and laminated together with the liquid crystal layer disposed there between to form liquid crystal cell portions 103. The removable portions can be peeled away from the polymeric substrate with the release liner to allow access to the underlying conductive traces on the opposing polymeric substrate forming the liquid crystal cell or passive matrix liquid crystal cell. Then, each liquid crystal cell portion 103 can be singulated and assembled into a display device, as desired.

The liquid crystal cell constructions described above and the methods of forming a continuous webbing of liquid crystal cells described below, provides a way of obtaining access to electrical leads and can be used in various display technology on a continuous roll-to-roll process. Several advantages of the constructions and methods described herein include a easy method to obtain access to electrical leads after lamination by removing the pre-cut portions, as compared to doing precise depth cutting after lamination, and elimination of the risk of scratching or destroying the conductive electrical leads during precise-depth cutting after lamination. It is advantageous to keep the pre-cut windows or openings or removable portions in place in the substrate to avoid wasting liquid crystal coating material by filling up the space that happens when the pre-cut window is removed prior to coating. Additionally, leaving the pre-cut window in place results in minimizing coating interruptions that may occur from a sudden change of substrate thickness. The substrate can be pre-cut against the liner, which serves as a carrier that keeps both the substrate and the pre-cut pattern together during coating. After the coating is completed, the liner can then be peeled off before or at the same time as when the pre-cut window is removed. Liquid crystal material can be removed in the vicinity of the removed window by wiping with an appropriate solvent such as, isopropyl alcohol or methanol to obtain access to the bare electrical leads.

The first polymeric substrate 130 and the second polymeric substrate 120 can be formed of any useful polymeric material. In many embodiments, one or both polymeric substrates 130 and 120 can be transparent to visible light. In many embodiments, the first polymeric substrate 130 and the second polymeric substrate 120 are formed from a suitable polymeric material that has sufficient mechanical properties (e.g., strength and flexibility) to be processed in a roll-to-roll apparatus. By roll-to-roll, what is meant is a process where material is wound onto or unwound from a support, as well as further processed in some way. Examples of further processes include coating, slitting, blanking, and exposing to radiation, or the like. Examples of such polymers include thermoplastic polymers. Examples of useful thermoplastic polymers include polyolefins, polyacrylates, polyamides, polyimides, polycarbonates, polyesters, and biphenol- or naphthalene-based liquid crystal polymers. Further examples of useful thermoplastics include polyethylene, polypropylene, polystyrene, poly(methylmethacrylate), polycarbonate of bisphenol A, poly(vinyl chloride), polyethylene terephthalate, polyethylene naphthalate, and poly(vinylidene fluoride). Some of these polymers also have optical properties (e.g., transparency) that make them especially well-suited for certain display applications wherein they would support a patterned conductor, such as polycarbonates, polyimides, and/or polyesters.

The first polymeric substrate 130 and the second polymeric substrate 120 are flexible. The first substrate 130 and the second substrate 120 can have any useful thickness. These polymeric substrates 130 and 120 can be manufactured in a variety of thickness, ranging in general from about 5 micrometers to 1000 micrometers or from 25 micrometers to 500 micrometers, or from 50 micrometers to 250 micrometers, or from 75 micrometers to 200 micrometers.

The plurality of first parallel conductive traces 132 and plurality of second parallel conductive traces 122 can be formed in any useful manner such as, for example, sputtering, chemical vapor deposition and the like. The parallel conductive traces 132, 122 can be a relatively conductive, transparent coating. In many embodiments, the parallel conductive traces 132, 122 are transparent to visible light. The parallel conductive traces 132, 122 can include indium tin oxide or ITO, which can be transparent to visible light, depending on the thickness of the ITO conductor. In many embodiments, the parallel conductive traces 132, 122 has a generally uniform sheet resistivity. The parallel conductive traces 132, 122 can have any useful thickness such as, for example, a thickness of 10-100 nm. The pattern of the parallel conductive traces 132, 122 may depend in part on the type of display and design parameters, such as size of end user display, etc. The parallel conductive traces 132, 122 can include a tin antimony oxide, a zinc oxide, or other appropriate conductive material.

The liquid crystal layer 110 can be formed of any liquid crystal useful for display applications such as passive matrix displays. In many embodiments, the liquid crystal layer 110 is formed of a cholesteric liquid crystal. Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360 degrees. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435, 5,332,522, 5,886,242, 5,847,068, 5,780,629, and 5,744,057, all of which are incorporated herein by reference. Other cholesteric liquid crystal compounds can also be used. A cholesteric liquid crystal compound may be selected for a particular application or optical body based on one or more factors including, for example, refractive indices, surface energy, pitch, processability, clarity, color, low absorption in the wavelength of interest, compatibility with other components (e.g., a nematic liquid crystal compound, etc.), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

In many embodiments, the cholesteric liquid crystal layer is a polymer dispersed liquid crystal composition that includes a liquid crystal phase dispersed (disperse phase) within a polymeric matrix (continuous phase). In many embodiments, the polymer dispersed liquid crystal composition is formed by polymerization induced phase separation (PIPS), where the size of the formed liquid crystal phase droplets is at least partially controlled by polymerization kinetics.

In many embodiments, this construction forms a bistable reflective cholesteric liquid crystal display or passive matrix display. Application of an electric field (E) across the parallel conductive traces 132, 122 causes the liquid crystal to be aligned in either the reflective planar state or the scattering focal conic state. Both of these states are stable at E=0, thus the textures are locked in and will remain intact until acted upon again (i.e., the device is bistable). Switching from the planar to focal conic requires a low voltage pulse while the return from focal conic to planar requires a higher voltage pulse to drive the device into a homeotropic state which then relaxes to the final planar state. An illustrative drive scheme for switching single pixel cholesteric liquid crystal display (i.e., ChLCD) cells is described by Deng-Ke Ynag et. al., (Annu. Rev. Mater. Sci. 1977, 27, 117-146). According to reflectance versus voltage plots described therein ChLCD cells can be switched to a voltage value at which the cell is in the planar state or voltage value at which point the cell is in the focal conic state. The associated pulse trains (frequency and amplitude) can be practiced by anyone skilled in the art.

Exemplary liquid crystal compositions are described in U.S. Pat. No. 7,648,645 (Roberts et al.), the disclosure of which is incorporated by reference herein and the disclosure therein gives corresponding stable planar state reflection. By stable state reflection it is meant that after being driven to the planar state by a voltage the cell experiences no loss of reflection after standing at ambient conditions for about three days.

The liquid crystal layer 110 can have any useful thickness such as, for example, a thickness in a range from 1 to 15 micrometers. This polymer dispersed liquid crystal layer 110 having a thickness in a range from 1 to 15 micrometers can be formed via radiation curing in a range from 0.1 to 10 mW/cm$^2$ or in a range from 0.2 to 3 mW/cm$^2$.

The polymer dispersed liquid crystal layer 110 can be formed by a process in which a reactive pre-polymer/liquid crystal composition is mixed and polymerized. In many embodiments, the reactive pre-polymer/liquid crystal composition forms a single phase where the liquid crystal does not polymerize. As the composition polymerizes, the polymer separates from the liquid crystal forming liquid crystal domains (e.g., droplets) dispersed within a polymer matrix. This phase separation process is termed polymerization induced phase separation (i.e., PIPS). In the PIPS process, the polymer phase separates from the liquid crystal during polymerization as the polymer chain length increases. The reactive pre-polymer/liquid crystal composition includes a liquid crystal component, a photo polymerization initiator and a polymer precursor component. The components are chosen so that pre-polymer/liquid crystal composition forms a single phase until it is polymerized.

The liquid crystal component can be any useful liquid crystal such as, for example, a cholesteric liquid crystal material or a nematic liquid crystal material. The liquid crystal can be present in the composition in any useful amount. In many embodiments, the liquid crystal can be present in the composition a range from 60 to 95% wt, or from 70 to 95% wt.

The photo polymerization initiator can be any useful photo polymerization initiator. In many embodiments, the photo initiator includes hydroxy-alkylbenzophenones (e.g., DAROCUR™ photo initiator available from Merck), benzoin ethers, alkylphenones, benzophenones, xanthones, thioxanthones, phosphine oxides (e.g., IRGACURE™ photo initiator 819 available from Ciba Specialty Chemicals), and their derivatives. Additional useful photo polymerization initiators are described in U.S. Pat. No. 5,516,455 and is incorporated by reference to the extent it does not conflict with the present disclosure. The photo polymerization initiator can be present in the composition in any useful amount. In many embodiments, the photo polymerization initiator can be present in a range from 0.01 to 10% wt, or from 0.1 to 5% wt, or from 1 to 2% wt.

In some embodiments, the liquid crystal layer 110 includes spacer beads (not shown) to assisting in providing a uniform spacing between the polymeric substrates.

Figure 3:
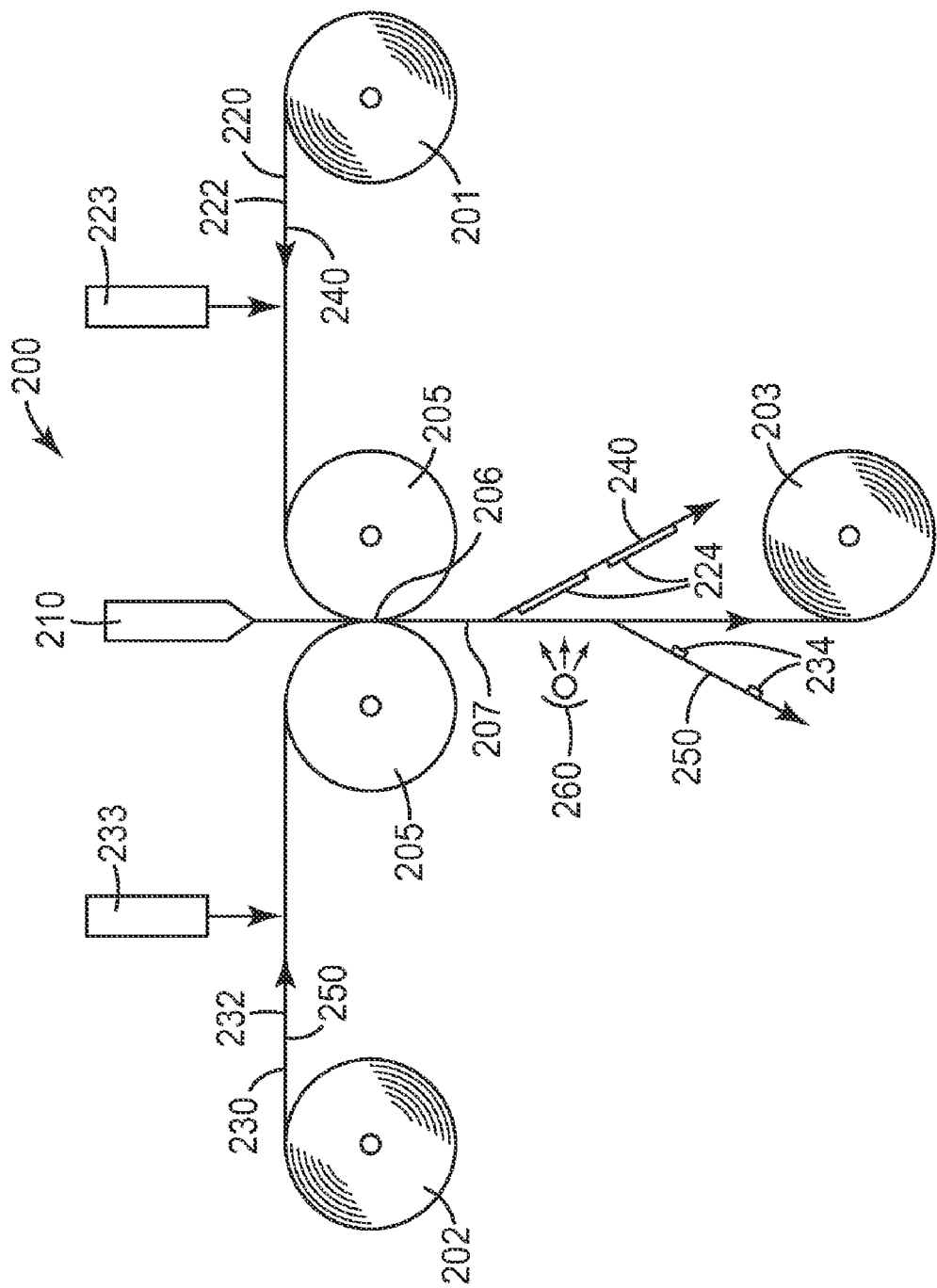
FIG. 3 is a schematic diagram of an illustrative roll-to-roll lamination process for forming a number of liquid crystal cells on continuous webbing.

FIG. 3 is a schematic diagram of an illustrative roll-to-roll lamination process 200 for forming a number of liquid crystal cells on a continuous webbing described above. The apparatus 200 includes a first roll 202 of continuous polymeric substrate or webbing 230 having a plurality of first parallel conductive traces 232 extending in a first direction, and a second roll 201 of continuous polymeric substrate or webbing 220 having a plurality of second parallel conductive traces 222 extending in a second direction being orthogonal to the first direction. In many embodiments, the plurality of first parallel conductive traces 232 and plurality of second parallel conductive traces 222 are divided into a plurality of discrete portions as described above. The first roll 202 of continuous polymeric substrate or webbing 230 includes a first release liner 250 and the second roll 201 of continuous polymeric substrate or webbing 220 includes a second release liner 240.

The apparatus 200 includes first and second cutting devices 233, 223 associated with the first and second webbings 230, 220. The cutting devices 233, 223 cut, emboss, or perforate (described above) the first and second webbings 230, 220 at predetermined locations that correspond to conductive trace ends (described above) of the opposing webbing once the webbings are laminated together. The cutting devices 233, 223 forming the removable portions 234, 224 of the webbings (described above) that are removed with the liners 250, 240 following lamination of the first and second webbings 230, 220.

The apparatus 200 includes a pair of nip rollers 205 that define a nip point 206. The nip rollers direct the first and second webbings 230, 220 toward the nip point 206 where a liquid crystal dispenser 210 dispenses liquid crystal material and laminates the liquid crystal material between the first and second webbings 230, 220 and form the liquid crystal cell webbing 207.

The liquid crystal cell webbing 207 can be cured via a curing element 260 and the release liners 250, 240 removed from the liquid crystal cell webbing 207. In some embodiments, the liquid crystal cell webbing 207 is cured via a curing element 260 and then the release liners 250, 240 are removed from the liquid crystal cell webbing 207. In other embodiments, the liquid crystal cell webbing 207 is cured via a curing element 260 after the release liners 250, 240 are removed from the liquid crystal cell webbing 207. The removable portions 234, 224 are removed with the release liners 250, 240 to allow access to the underlying conductive traces on the opposing polymeric substrate forming the liquid crystal cell or passive matrix liquid crystal cell. The liquid crystal cell continuous webbing 207 can be placed on a product roll 203 and/or each liquid crystal cell portion can be singulated and assembled into a display device, as described above.

Figure 5:
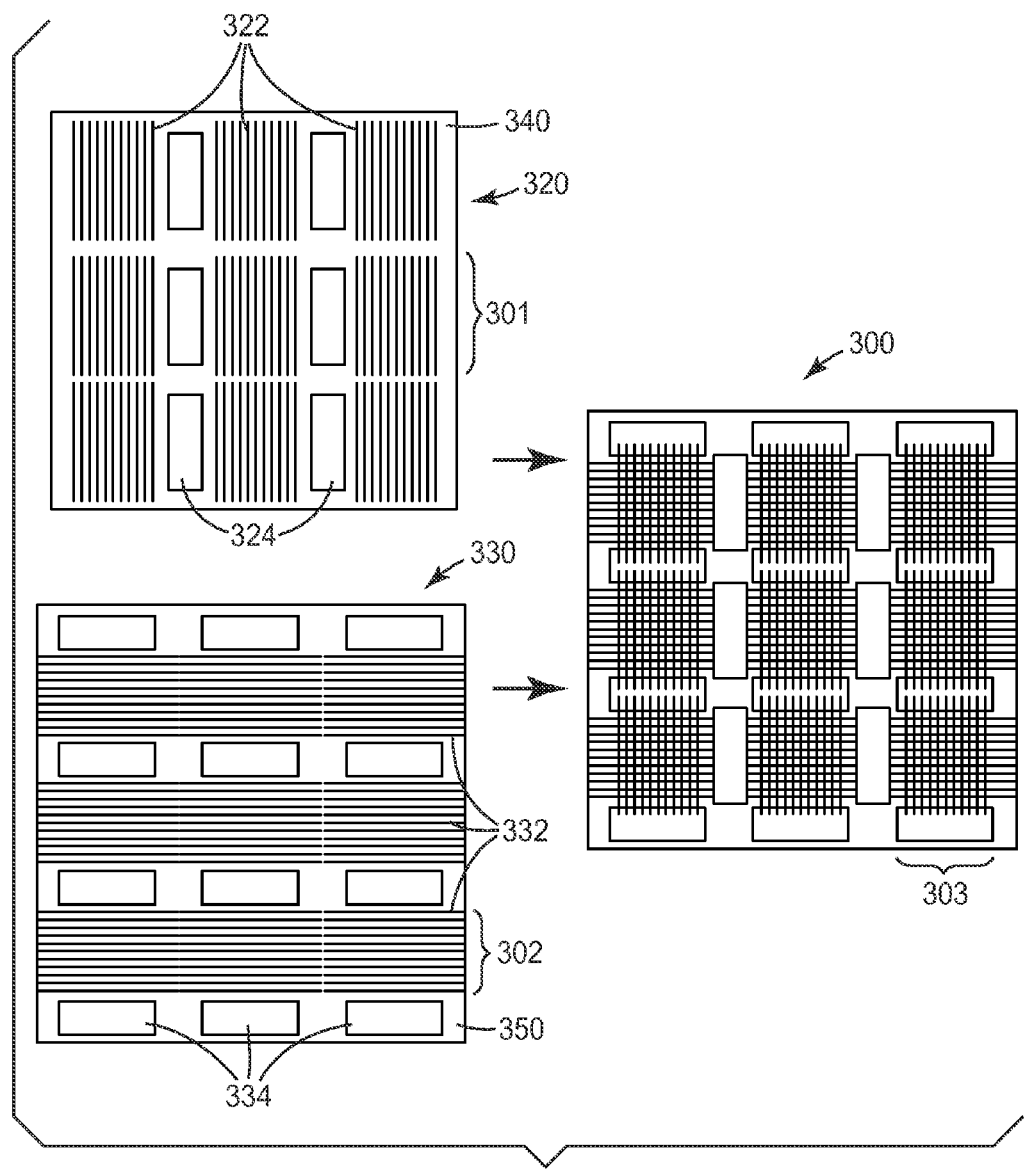
FIG. 5 is a schematic top view of another illustrative lamination of two substrates forming a number of liquid crystal cells on continuous webbing.

FIG. 5 is a schematic top view of another illustrative lamination of two substrates forming a number of liquid crystal cells 300 on continuous webbing. Each illustrated substrate is a segment of continuous webbing, where each segment has nine cells or a 3×3 segment. It is understood that each substrate can have more or less cells in any arrangement and in many embodiments, the each continuous webbing has a plurality of cell such as, for example, 10 or more, 25 or more, 50 or more, or 100 or more, as desired. Each liquid crystal cell segment 300 includes a layer of liquid crystal material disposed between a first polymeric substrate 330 and a second polymeric substrate 320, as described above.

The first polymeric substrate 330 includes a plurality of first parallel conductive traces 332 extending in a first direction and disposed between the layer of liquid crystal material and the first substrate 330. A first release liner, described above is disposed on the first polymeric substrate 330. In many embodiments, the plurality of first parallel conductive traces 332 are divided into a plurality of discrete first portions, 302 having first trace ends and opposing second trace ends. In some embodiments, the plurality of second parallel conductive traces 332 are continuous lines that have trace ends formed by singulating each cell 303.

The second polymeric substrate 320 includes a plurality of second parallel conductive traces 322 extending in a second direction orthogonal to the first direction and disposed between the layer of liquid crystal material and the second substrate 320. In many embodiments, a second release liner is disposed on the second polymeric substrate 320. In many embodiments, the plurality of second parallel conductive traces 322 are divided into a plurality of discrete second portions 301 having first trace ends and opposing second trace ends. In some embodiments, the plurality of second parallel conductive traces 322 are continuous lines that have trace ends formed by singulating each cell 303.

The first polymeric substrate 330 further includes a removable portion 334 that is separable from the first polymeric substrate 330 with the first release liner (as described above) to expose a portion of the layer of liquid crystal material, that can be wiped away to expose second parallel conductive traces 322. The removable portion 334 is separated with the liner and away from the first polymeric substrate 330 as the removable liner 350 separates from the remaining first polymeric substrate 330, as described above. The removable portion 334 is defined by a predetermined slit or line of weakness such as, for example, a perforation line. The predetermined slit or line of weakness can be formed by any useful method such as, for example, die cutting, laser cutting, and the like.

In many embodiments as illustrated in FIG. 5, the second polymeric substrate 320 further includes a removable portion 324 that is separable from the second polymeric substrate 320 with the second release liner to expose a portion of the layer of liquid crystal material, as described above, and that can be wiped away to expose first parallel conductive traces 332. The removable portion 324 is separated with the liner and away from the second polymeric substrate 320 as the removable liner separates from the remaining second polymeric substrate 320, as described above. The removable portion 324 is defined by a predetermined slit or line of weakness such as, for example, a perforation line. The predetermined slit or line of weakness can be formed by any useful method such as, for example, die cutting, laser cutting, embossing, and the like.

The first portions 302 and second portions 301 are registered and laminated together with the liquid crystal layer disposed there between to form liquid crystal cell portions 303. The removable portions can be peeled away from the polymeric substrate with the release liner to allow access to the underlying conductive traces on the opposing polymeric substrate forming the liquid crystal cell or passive matrix liquid crystal cell. Then, each liquid crystal cell portion 303 can be singulated and assembled into a display device, as desired.

The liquid crystal cell constructions described above and the methods of forming a continuous webbing of liquid crystal cells described above, provide a method of obtaining access to electrical leads and can be used in various display technology on a continuous roll-to-roll process.

EXAMPLE

Figure 4A:
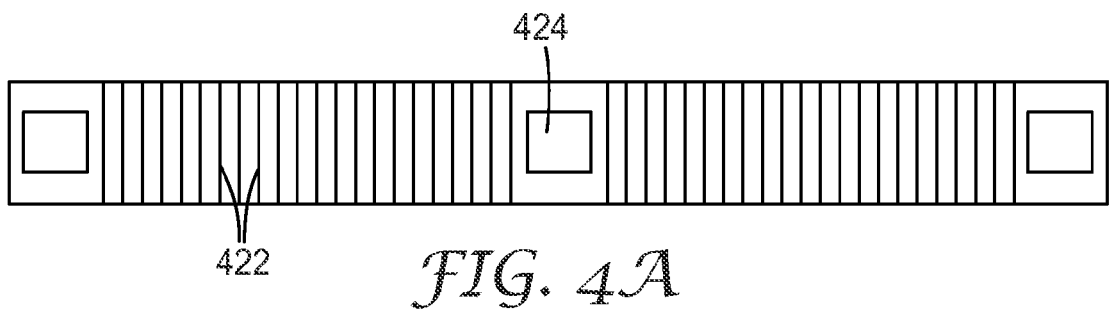
FIGS. 4A-4C are schematic top views of an illustrative lamination of two substrates forming a number of liquid crystal cells on continuous webbing according to the Example.
Figure 4B:
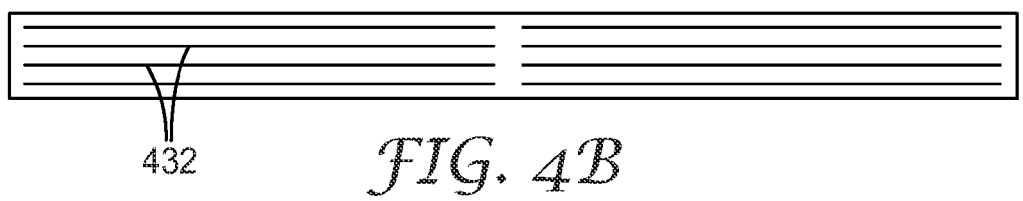

ITO rows and columns were patterned on a 24 inch wide 5 mil Dupont Teijin ST-504 polyethylene terephthalate film as shown in FIGS. 4A and 4B. This web was slit into four widths with two widths being six inches wide with the column pattern (FIG. 4A cross web ITO lines 422) and two widths being 4.25 inches wide with the row pattern (FIG. 4B down web ITO lines 432). The two six inch wide rolls (FIG. 4A) had a clear liner laminated to them on the non-ITO side. Windows 424 were rotary die cut into the substrates between the column patterns. Each window 424 was about 3.5 inch by 4 inch in size. The windows 424 remained in place with the rest of the substrate on the clear carrier liner.

Figure 4C:
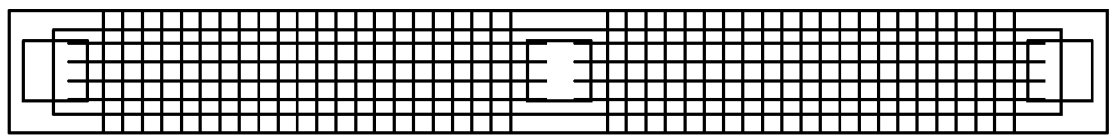

This die cut six inch column pattern webbing (FIG. 4A) was placed as the bottom substrate on a roll-to-roll apparatus. The narrower 4.25 inch row pattern webbing (FIG. 4B) was placed as the top substrate on the roll-to-roll apparatus. FIG. 4C shows a schematic top view of how the substrates were aligned.

The two substrates were brought together in a nip process where cholesteric liquid crystal coating solution was dispensed between the substrates and then cured and sheeted off the end of the roll-to-roll apparatus. Then the liner was removed from the back of the column substrate and the pre-cut windows were also removed with the liner. After removing the windows an alcohol wipe over the area under where the window was present results in exposing bare electrical contacts.

Thus, embodiments of the LIQUID CRYSTAL DISPLAY PANEL AND METHODS OF MANUFACTURING THE SAME are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A liquid crystal cell article comprising:
a layer of liquid crystal material disposed between a first polymeric substrate and a second polymeric substrate;
the first polymeric substrate comprising a plurality of first parallel conductive traces extending in a first direction and disposed between the layer of liquid crystal material and the first substrate, and a first release liner disposed on the first polymeric substrate; and
the second polymeric substrate comprising a plurality of second parallel conductive traces extending in a second direction orthogonal to the first direction and disposed between the layer of liquid crystal material and the second substrate;
wherein the first polymeric substrate further comprises one or more first structures defining a removable portion that is separable from the first polymeric substrate with the first release liner to expose a portion of the layer of liquid crystal material or a portion of the second parallel conductive traces.

2. A liquid crystal cell according to claim 1, wherein the second polymeric substrate further comprises a second release liner and one or more second structures defining a second removable portion that is separable from the second polymeric substrate with the second release liner to expose a portion of the layer of liquid crystal material or a portion of the first parallel conductive traces.

3. A liquid crystal cell according to claim 2, wherein the removable portion is shaped as a first rectangle, and the second removable portion is shaped as a second rectangle.

4. A liquid crystal cell according to claim 3, wherein the first rectangle is in registration with a plurality of ends of the plurality of second parallel conductive traces, and the second rectangle is in registration with a plurality of ends of the plurality of first parallel conductive traces.

5. A liquid crystal cell according to claim 3, wherein the first rectangle extends along a first in-plane axis, and the second rectangle extends along a second in-plane axis different from the first in-plane axis.

6. A liquid crystal cell according to claim 1, wherein the layer of liquid crystal material comprises a cholesteric liquid crystal material.

7. A liquid crystal cell according to claim 1, wherein the plurality of first parallel conductive traces and second parallel conductive traces are transparent.

8. A liquid crystal cell according to claim 1, wherein the one or more first structures comprise a slit.

9. A liquid crystal cell according to claim 1, wherein the second parallel conductive traces are divided into a plurality of second parallel conductive trace portions, each second parallel conductive trace portion defined by first trace ends and second trace ends, and wherein the removable portion is in registration with a plurality of adjacent ones of the first trace ends or the second trace ends.

10. A liquid crystal cell according to claim 1, wherein the one or more first structures comprise a line of weakness.

11. A liquid crystal cell according to claim 1, wherein the one or more first structures comprise a perforation.

12. A liquid crystal cell according to claim 1, wherein the liquid crystal cell article is in the form of a continuous web of discrete liquid crystal cell articles, the removable portion of the first polymeric substrate being one of a first plurality of removable portions formed in the first polymeric substrate, each of the discrete liquid crystal cell articles being associated with at least one of the first plurality of removable portions.

13. A liquid crystal cell according to claim 1, wherein the layer of liquid crystal material comprises a layer of cured liquid crystal material.

14. A liquid crystal cell article, comprising:
   a first polymeric substrate having a plurality of first parallel conductive traces formed thereon;
   a second polymeric substrate having a plurality of second parallel conductive traces formed thereon;
   a layer of liquid crystal material disposed between the first and second polymeric substrates; and
   a first release liner disposed on a side of the first polymeric substrate opposite the layer of liquid crystal material, and opposite the plurality of first parallel conductive traces;
   wherein one or more first structures are formed in the first polymeric substrate to define a first removable portion that is separable from the first polymeric substrate with the first release liner, the first removable portion being shaped to allow access to a portion of the layer of liquid crystal material or a portion of the second parallel conductive traces.

15. The article of claim 14, wherein the article is in the form of a continuous web, wherein the first parallel conductive traces are arranged into discrete subgroups of traces having first and second ends, and wherein the second parallel conductive traces are also arranged into discrete subgroups of traces having first and second ends, the subgroups of the first parallel conductive traces being registered with the subgroups of the second parallel conductive traces to define distinct liquid crystal articles disposed in a row along a length of the continuous web.

16. The article of claim 15, wherein the first removable portion is one of a first plurality of removable portions formed in the first polymeric substrate, each of the distinct liquid crystal articles having at least one of the first plurality of removable portions.

17. The liquid crystal cell article of claim 14, further comprising:
   a second release liner disposed on a side of the second polymeric substrate opposite the layer of liquid crystal material, and opposite the plurality of second parallel conductive traces;
   wherein one or more second structures are formed in the second polymeric substrate to define a second removable portion that is separable from the second polymeric substrate with the second release liner, the second removable portion being shaped to allow access to a portion of the layer of liquid crystal material or a portion of the first parallel conductive traces.

18. The article of claim 17, wherein the article is in the form of a continuous web, wherein the first parallel conductive traces are arranged into discrete subgroups of traces having first and second ends, and wherein the second parallel conductive traces are also arranged into discrete subgroups of traces having first and second ends, the subgroups of the first parallel conductive traces being registered with the subgroups of the second parallel conductive traces to define distinct liquid crystal articles disposed in a row along a length of the continuous web.

19. The article of claim 18, wherein the first removable portion is one of a first plurality of removable portions formed in the first polymeric substrate, wherein the second removable portion is one of a second plurality of removable portions formed in the second polymeric substrate, each of the distinct liquid crystal articles having at least one of the first plurality of removable portions and at least one of the second plurality of removable portions.

* * * * *